United States Patent
Arvind et al.

(10) Patent No.: US 10,596,558 B2
(45) Date of Patent: Mar. 24, 2020

(54) NAPHTHA REFORMING CATALYST AND PROCESSES THEREOF

(71) Applicant: RELIANCE INDUSTRIES LIMITED, Mumbai (IN)

(72) Inventors: Deshmukh Amit Arvind, Jalgaon (IN); Basu Sanchari, Ahmedabad (IN); Limbasiya Nilamkumar Babubhai, Amreli (IN); Yadav Ashwani, Panchkula (IN); Parmar Sagar, Rajkot (IN); Dongara Rajeshwer, Nalgonda (IN); Mandal Sukumar, Faridabad (IN); Das Asit, Faridabad (IN)

(73) Assignee: RELIANCE INDUSTRIES LIMITED, Mumbai, Maharashtra (IN)

( * ) Notice: Subject to any disclaimer, the term of this patent is extended or adjusted under 35 U.S.C. 154(b) by 266 days.

(21) Appl. No.: 15/355,144

(22) Filed: Nov. 18, 2016

(65) Prior Publication Data

US 2017/0144138 A1 May 25, 2017

(30) Foreign Application Priority Data

Nov. 20, 2015 (IN) .......................... 4376/MUM/2015

(51) Int. Cl.
| | | |
|---|---|---|
| *B01J 29/06* | (2006.01) | |
| *B01J 29/40* | (2006.01) | |
| *B01J 37/08* | (2006.01) | |
| *B01J 37/00* | (2006.01) | |
| *B01J 37/02* | (2006.01) | |
| *C10G 35/095* | (2006.01) | |
| *C10G 35/14* | (2006.01) | |
| *C10G 35/06* | (2006.01) | |
| *B01J 29/08* | (2006.01) | |
| *B01J 29/70* | (2006.01) | |
| *B01J 35/10* | (2006.01) | |

(52) U.S. Cl.
CPC .......... *B01J 29/405* (2013.01); *B01J 29/085* (2013.01); *B01J 29/088* (2013.01); *B01J 29/7049* (2013.01); *B01J 35/109* (2013.01); *B01J 35/1019* (2013.01); *B01J 35/1038* (2013.01); *B01J 35/1061* (2013.01); *B01J 35/1085* (2013.01); *B01J 37/0009* (2013.01); *B01J 37/0221* (2013.01); *B01J 37/08* (2013.01); *C10G 35/065* (2013.01); *C10G 35/095* (2013.01); *C10G 35/14* (2013.01); *B01J 37/009* (2013.01); *B01J 2229/186* (2013.01); *B01J 2229/20* (2013.01); *B01J 2229/30* (2013.01); *B01J 2229/42* (2013.01); *C10G 2300/1044* (2013.01); *C10G 2400/30* (2013.01)

(58) Field of Classification Search
CPC ........ C10G 2400/30; C10G 2300/1044; C10G 35/095; C10G 35/065; C10G 35/14; B01J 29/405; B01J 29/085; B01J 29/088; B01J 29/7049; B01J 37/08; B01J 37/0009; B01J 37/0221; B01J 35/1019; B01J 35/1038; B01J 35/1061; B01J 35/1085; B01J 35/109; B01J 2229/30; B01J 2229/42; B01J 2229/186; B01J 2229/20

USPC ............... 502/60, 61, 64, 69, 71, 73, 77, 79; 208/134, 135, 141

See application file for complete search history.

(56) References Cited

U.S. PATENT DOCUMENTS

| | | | |
|---|---|---|---|
| 3,756,942 A | | 9/1973 | Cattanach |
| 4,490,569 A | * | 12/1984 | Chu .......................... B01J 29/40 502/341 |
| 4,939,110 A | * | 7/1990 | Sachtler ................ C07C 5/2791 502/66 |
| 4,957,891 A | * | 9/1990 | Sachtler ................ C07C 5/2724 502/61 |
| 6,420,295 B1 | * | 7/2002 | Wu ........................ B01J 29/061 502/60 |
| 2005/0020435 A1 | * | 1/2005 | Beck ........................ B01J 29/04 502/63 |
| 2013/0087483 A1 | * | 4/2013 | Haizmann .............. C10G 69/04 208/68 |
| 2013/0131411 A1 | * | 5/2013 | Blommel .............. C07C 1/2076 585/304 |
| 2013/0261363 A1 | * | 10/2013 | Serban ..................... B01J 23/63 585/430 |

(Continued)

FOREIGN PATENT DOCUMENTS

| | | | |
|---|---|---|---|
| CN | 104923288 A | | 9/2015 |
| EP | 0130251 | * | 1/1985 |
| WO | WO-2008/109877 A1 | | 9/2008 |
| WO | WO-2015/150881 A1 | | 10/2015 |

OTHER PUBLICATIONS

Kanai, J., et al., "Aromatization of N-Hexane over ZnO/H-ZSM-5 Catalysts", Journal of Catalysis, vol. 114, 1988, pp. 284-290.

(Continued)

*Primary Examiner* — Elizabeth D Wood
(74) *Attorney, Agent, or Firm* — Drinker Biddle & Reath LLP

(57) ABSTRACT

The present invention provides catalyst comprising metal modified zeolite, particularly Group IIIA or Group IIB metal modified zeolite, or a Group IIIA metal and Group IIB metal modified zeolite for reforming of heart cut naphtha stream. The present disclosure also relates to a process for synthesis of the catalyst. The present disclosure further relates to a process for reforming of heart cut naphtha stream, with high selectivity towards aromatics and good activity using the catalytic system, in the absence of hydrogen.

20 Claims, 1 Drawing Sheet

(56) References Cited

U.S. PATENT DOCUMENTS

| | | | | |
|---|---|---|---|---|
| 2013/0270153 A1* | 10/2013 | Heraud | ................ | C10G 65/12 |
| | | | | 208/60 |
| 2014/0187828 A1* | 7/2014 | Bauldreay | ................ | C10L 1/02 |
| | | | | 585/14 |
| 2015/0321976 A1* | 11/2015 | Larson | ................ | B01J 8/087 |
| | | | | 585/304 |

OTHER PUBLICATIONS

European Search Report dated Apr. 11, 2018 in 16275167.1.
Extended European Search Report dated Apr. 18, 2018 in 16275167.1.

* cited by examiner

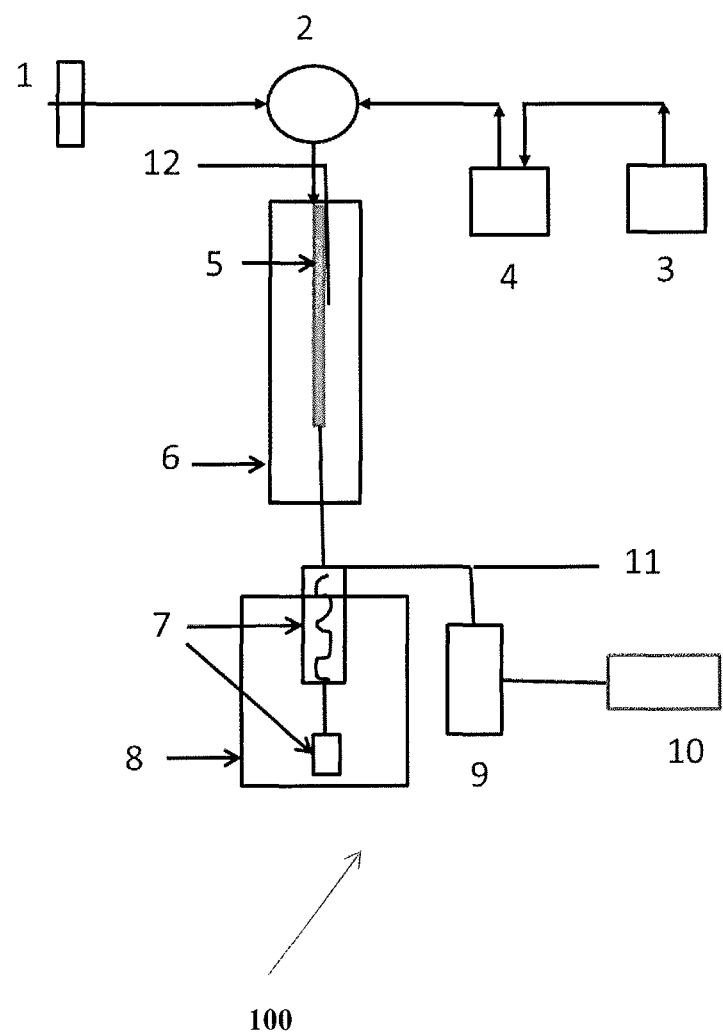

NAPHTHA REFORMING CATALYST AND PROCESSES THEREOF

RELATED APPLICATION DATA

This application claims priority under 35 U.S.C. § 119 and/or § 365 to Indian Application No. 4376/MUM/2015 filed Nov. 20, 2015.

TECHNICAL FIELD

The present disclosure relates to the field of Chemistry in general and more specifically to the field of Petrochemicals. Particularly, the present disclosure relates to a catalyst for production of high octane aromatics by reformation of heart cut naphtha stream. In an exemplary embodiment, the present disclosure relates to metal modified zeolite catalyst. The present disclosure also relates to synthesis of said catalyst as well as process for reformation of heart cut naphtha stream using said catalyst for production of high octane aromatics.

BACKGROUND OF THE DISCLOSURE

Catalytic naphtha reforming (CNR) is one of the most important processes for high octane gasoline manufacturing and aromatics production because of the demand of these kinds of products in market. The prominent reactions such as dehydrogenation, isomerization, dehydrocyclization, hydrocracking and coke formation occurs during CNR process of which hydrocracking and coke formation are undesirable. The reforming catalyst consists of metal and acid functional sites wherein dehydrogenation reaction; isomerization and hydrocracking takes place on the metal and acid function site respectively. However, dehydrocyclization reaction occurs on both the functions. These aromatic compounds with high octane value can be blended for the high octane gasoline. These aromatic compounds can also be used as starting materials for fine and petrochemical products. Hence, there is always need to develop a process which can produce aromatic compounds and at the same time hydrogen gas.

Currently, the reforming catalysts being used are platinum (Pt) based. However, these catalysts are associated with various disadvantages. Firstly, the platinum based catalysts are expensive. Secondly, the Pt catalysts require an additional supportive metal which is required for dispersion of Pt for its activation. Therefore, processes involving Pt based reforming catalysts are energy intensive. Thirdly, Chlorine is required for regeneration and re-distribution of Pt metals, which causes corrosion in downstream operation. Further, the presence of sulphur in the feed causes the Pt based catalyst to deactivate fast.

Thus, there is a need for reforming catalysts that overcome the drawbacks of the prior art catalysts.

STATEMENT OF THE DISCLOSURE

Accordingly, the present disclosure relates to a naphtha reforming catalyst comprising metal, zeolite and binder, wherein the metal is selected from Group IIIA metal, Group IIB metal or combination thereof; a process for preparing naphtha reforming catalyst comprising metal, zeolite and binder, wherein metal is selected from Group IIIA metal, Group IIB metal or combination thereof, said process comprising acts of: a) adding binder source to zeolite or adding metal to zeolite followed by binder source, optionally along with reagent to obtain extruder, b) drying and calcining the extruder to obtain calcined extruder, c) crushing the calcined extruder to obtain powder, d) optionally loading metal onto the powder to obtain metal loaded powder, and e) drying and calcining the metal loaded powder to obtain the catalyst; and a process for reforming naphtha stream, said process comprising acts of: a) combining naphtha stream with catalyst comprising metal, zeolite and binder, wherein metal is selected from Group IIIA metal, Group IIB metal or combination thereof, to obtain reaction mixture, and b) separating gaseous and liquid product from the reaction mixture to reform naphtha stream.

BRIEF DESCRIPTION OF THE ACCOMPANYING FIGURE

In order that the disclosure may be readily understood and put into practical effect, reference will now be made to exemplary embodiments as illustrated with reference to the accompanying FIGURE. The FIGURE together with detailed description below, are incorporated in and form part of the specification, and serve to further illustrate the embodiments and explain various principles and advantages, in accordance with the present disclosure where:

FIG. 1 depicts an exemplary embodiment of the present disclosure which illustrates Reactor for performing the process of the present disclosure.

DETAILED DESCRIPTION OF THE DISCLOSURE

The present disclosure relates to a naphtha reforming catalyst comprising metal, zeolite and binder, wherein the metal is selected from Group IIIA metal, Group IIB metal or combination thereof.

The present disclosure also relates to a process for preparing naphtha reforming catalyst comprising metal, zeolite and binder, wherein metal is selected from Group IIIA metal, Group IIB metal or combination thereof, said process comprising acts of:
  a) adding binder source to zeolite or adding metal to zeolite followed by binder source, optionally along with reagent to obtain extruder;
  b) drying and calcining the extruder to obtain calcined extruder;
  c) crushing the calcined extruder to obtain powder;
  d) optionally loading metal onto the powder to obtain metal loaded powder; and
  e) drying and calcining the metal loaded powder to obtain the catalyst.

In an embodiment of the present disclosure, prior to adding the binder source or the metal to the zeolite, the zeolite is calcined at temperature ranging from about 500° C. to about 550° C., preferably about 550° C. for time period ranging from about 10 hours to about 18 hours, preferably about 15 hours; wherein the binder source is selected from group comprising Pseudoboehmite, aluminium hydroxide, aluminium sulphate and aluminium chloride, preferably Pseudoboehmite; wherein the reagent is selected from alcohol and acid, wherein the alcohol is polyvinyl alcohol and wherein the acid is selected from acetic acid and nitric acid; and wherein the reagent functions as binding agent.

In another embodiment of the present disclosure, the calcining of the extruder is carried out at temperature ranging from about 500° C. to about 600° C., preferably about 550° C., for time period ranging from about 10 hours to about 15 hours; the crushing is carried out in ball mill; and the powder obtained has size ranging from about −125 μm to about +45 μm.

In yet another embodiment of the present disclosure, the metal is loaded onto the powder or the calcined zeolite in the form of metal salt selected from group comprising metal nitrate salt, metal chloride salt, or metal sulphate salt, preferably metal nitrate salt, by technique selected from wetness impregnation and ion exchange, preferably wetness impregnation.

In yet another embodiment of the present disclosure, the drying is carried out at temperature ranging from about 80° C. to about 120° C., for time period ranging from about 10 hours to about 16 hours; and the calcining of the metal loaded powder is carried out at temperature ranging from about 400° C. to about 600° C. for time period ranging from about 10 hours to about 15 hours.

The present disclosure further relates to a process for reforming naphtha stream, said process comprising acts of:
  a) combining naphtha stream with catalyst comprising metal, zeolite and binder, wherein metal is selected from Group IIIA metal, Group IIB metal or combination thereof, to obtain reaction mixture; and
  b) separating gaseous and liquid product from the reaction mixture to reform naphtha stream.

In an embodiment of the present disclosure, the process is carried out in fixed bed reactor or fluidized bed reactor; and wherein the process is carried out at temperature ranging from about 350° C. to about 700° C., preferably from about 450° C. to about 600° C.; at Weight Hourly Space Velocity ranging from about 0.5 hr$^{-1}$ to about 3 hr$^{-1}$, preferably from about 1 hr$^{-1}$ to about 2 hr$^{-1}$; at pressure of about 1 atm, in presence of Nitrogen and in absence of hydrogen and halide.

In another embodiment of the present disclosure, the naphtha stream consists of component selected from group comprising paraffin at concentration ranging from about 40 wt % to about 70 wt %, preferably about 40 wt %, naphthene at concentration ranging from about 20 wt % to about 50 wt %, preferably about 40 wt %, aromatic compound at concentration range of about 5 wt % to about 20 wt %, preferably about 18 wt % and olefin at concentration ranging from about 0 wt % to about 2 wt %, or any combinations thereof.

In yet another embodiment of the present disclosure, the process yields aromatic compounds at concentration ranging from about 50% w/w to 90% w/w, with conversion yield ranging from about 50% to about 100%; and wherein the aromatic compound is high octane aromatic compound.

In yet another embodiment of the present disclosure, the Group IIIA metal is gallium and the Group IIB metal is Zinc; wherein the metal is at concentration ranging from about 1 wt % to about 20 wt %, preferably about 5 wt % to about 15 wt %, of the catalyst; the zeolite and binder combination is at concentration ranging from about 80 wt % to about 95 wt %, preferably from about 90 wt % to about 95 wt %, of the catalyst; and wherein when the catalyst comprises Group IIIA metal and Group IIB metal, the Group IIIA metal and Group IIB metal are present at ratio of about 1:1.

In yet another embodiment of the present disclosure, the zeolite is at concentration ranging from about 10 wt % to about 80 wt %, preferably about 30 wt % to about 50 wt %, of the zeolite and binder combination; and the binder is at concentration ranging from about 20 wt % to about 80 wt %, preferably about 40 wt % to about 40 wt %, of the zeolite and binder combination.

In yet another embodiment of the present disclosure, the zeolite is selected from group comprising ZSM-5, Faujasite including Y, or combination thereof; the zeolite has pore diameter ranging from about 0.5 nm to about 0.8 nm; ratio of silica to alumina in the zeolite ranges from about 20 to about 300, preferably about 30 to about 100; and the binder is selected from group comprising alumina or silica or combination thereof.

In still another embodiment of the present disclosure, the catalyst has surface area ranging from about 225 m$^2$/g to about 250 m$^2$/g, pore volume ranging from about 0.40 cm$^3$/g to about 0.45 cm$^3$/g, pore diameter ranging from about 68 Å to about 75 Å, weak acid sites ranging from about 0.19 Mmol/g to about 0.26 Mmol/g, strong acid sites ranging from about 0.40 Mmol/g to about 0.51 Mmol/g and total acidity ranging from about 0.6 Mmol/g to about 0.77 Mmol/g.

To overcome the non-limiting drawbacks as stated in the background, the present disclosure relates to catalyst, a process to obtain the catalyst and production of aromatics by reforming of heart cut naphtha stream using the catalyst.

The present disclosure relates to a catalyst, wherein the catalyst comprises a metal function and an acid function.

In an embodiment, the metal function comprises dehydrogenation metal; wherein metal is Group IIIA metal, Group IIB metal or combination thereof.

In a non-limiting embodiment, the Group IIIA metal is Gallium (Ga) and the Group IIB metal is Zinc (Zn). In a preferred embodiment, the metal is Gallium.

In another embodiment, the acid function comprises zeolite and binder. In a non-limiting embodiment of the present disclosure, the zeolite has pore diameter ranging from about 0.5 nm to about 0.8 nm, including but not limiting to Zeolite Socony Mobil (ZSM-5), Faujasite including but not limited to Y; and the binder is alumina or silica. In a preferred embodiment, the zeolite is ZSM-5 and the binder is alumina/gamma alumina. Zeolite and binder combination is referred to as support throughout the specification.

In another embodiment, the catalyst consists of metal, zeolite and binder, wherein the metal is Group IIIA metal such as Gallium or Group IIB metal such as Zinc, or combination thereof. Thus, the catalyst of the present disclosure is a metal modified zeolite catalyst.

In a preferred embodiment, the catalyst consists of Gallium, zeolite and binder. In another preferred embodiment, the catalyst consists of Gallium, ZSM-5 and Alumina.

In an embodiment, the catalyst comprising Gallium, ZSM-5 and gamma alumina has the following characteristics:

TABLE 1

Characteristics of Catalyst comprising Gallium, ZSM-5 and gamma alumina

| Surface Area | 225-250 (m$^2$/g) |
| Pore Volume | 0.42-0.53 (cm$^3$/g) |
| Pore Diameter | 70 Å- 75 (Å) |
| Weak Acid Sites | 0.19-0.192 (Mmol/g) |
| Strong Acid Sites | 0.41-0.44 (Mmol/g) |
| Total Acidity | 0.6-0.62 (Mmol/g) |

In another embodiment, the catalyst consists of Zinc, ZSM-5 and Alumina.

In an embodiment, the catalyst comprising Zinc, ZSM-5 and gamma alumina has the following characteristics:

TABLE 2

Characteristics of Catalyst comprising
Zinc, ZSM-5 and gamma alumina

| | | |
|---|---|---|
| Surface Area | 230-250 | (m²/g) |
| Pore Volume | 0.40-0.42 | (cm³/g) |
| Pore Diameter | 68 Å- 70 | (Å) |
| Weak Acid Sites | 0.25-0.26 | (Mmol/g) |
| Strong Acid Sites | 0.452-0.51 | (Mmol/g) |
| Total Acidity | 0.70-0.77 | (Mmol/g) |

In another embodiment, the catalyst consists of Zinc, Gallium, ZSM-5 and Alumina.

In an embodiment, the catalyst comprising Zinc-Gallium, ZSM-5 and gamma alumina has the following characteristics:

TABLE 3

Characteristics of Catalyst comprising
Zinc-Gallium, ZSM-5 and gamma alumina

| | | |
|---|---|---|
| Surface Area | 240-245 | (m²/g) |
| Pore Volume | 0.40-0.446 | (cm³/g) |
| Pore Diameter | 68 Å- 73 | (Å) |
| Weak Acid Sites | 0.22-0.224 | (Mmol/g) |
| Strong Acid Sites | 0.40-0.405 | (Mmol/g) |
| Total Acidity | 0.62-0.63 | (Mmol/g) |

In another embodiment of the present disclosure, the concentration of metal with respect to amount of total catalyst ranges from about 1 wt % to about 20 wt %, preferably from about 5 wt % to about 15 wt %, most preferably from about 5 wt % to about 10 wt %.

In yet another embodiment of the present disclosure, the concentration of zeolite with respect to amount of support (zeolite+binder) ranges from about 10 wt % to about 80 wt %, preferably from about 30 wt % to about 50 wt %. In an exemplary embodiment, if the support is prepared by mixing about 40 gm of zeolite and about 60 gm of alumina, then the concentration of zeolite is 40 wt % with respect to the support.

In yet another embodiment of the present disclosure, the alumina component with respect to the support (zeolite+binder) is present at a concentration ranging from about 20 wt % to about 80 wt %, preferably from about 40 wt % to about 60 wt %.

In a non-limiting embodiment of the present disclosure, the support comprising of mixture of ZSM-5 and gamma alumina is present at a concentration ranging from about 80 wt % to about 95 wt %, preferably from about 90 wt % to about 95%, with respect to the total catalyst.

In still another embodiment, the ratio of silica to alumina (SAR) in the zeolite ranges from about 20 to about 300, preferably about 30 to about 100.

In an embodiment, the present disclosure provides a catalyst comprising zinc, ZSM-5 and gamma alumina, wherein:
the concentration of zinc with respect to total catalyst ranges from about 1 wt % to about 20 wt %, preferably from about 5 wt % to about 15 wt %, most preferably from about 5 wt % to about 10 wt %;
the concentration of ZSM-5 with respect to amount of support ranges from about 10 wt % to about 80 wt %, preferably from about 30 wt % to about 50 wt %;
the concentration of alumina with respect to support ranges from about 20 wt % to about 80 wt %, preferably from about 30 wt % to about 50 wt %;
the concentration of support comprising of mixture of ZSM-5 and gamma alumina ranges from about 80 wt % to about 95 wt %, preferably from about 90 wt % to about 95%, with respect to the total catalyst;
and the SAR in the ZSM-5 ranges from about 20 to about 300, preferably about 30 to about 100.

In a preferred embodiment, the present disclosure provides a catalyst comprising gallium, ZSM-5 and gamma alumina, wherein:
the concentration of gallium with respect to total catalyst ranges from about 1 wt % to about 20 wt %, preferably from about 5 wt % to about 15 wt %, most preferably from about 5 wt % to about 10 wt %;
the concentration of ZSM-5 with respect to amount of support ranges from about 10 wt % to about 80 wt %, preferably from about 30 wt % to about 50 wt %;
the concentration of alumina with respect to support ranges from about 20 wt % to about 80 wt %, preferably from about 40 wt % to about 60 wt %;
the concentration of support comprising mixture of ZSM-5 and gamma alumina ranges from about 80 wt % to about 95 wt %, preferably from about 90 wt % to about 95%, with respect to the total catalyst; and
the SAR in the ZSM-5 ranges from about 20 to about 300, preferably about 30 to about 100.

In an embodiment, the present disclosure provides a catalyst comprising gallium, zinc, ZSM-5 and gamma alumina, wherein:
the concentration of gallium and zinc with respect to total catalyst ranges from about 1 wt % to about 20 wt %, preferably from about 5 wt % to about 15 wt %, most preferably from about 5 wt % to about 10 wt %, wherein the gallium and zinc are at ratio of 1:1;
the concentration of ZSM-5 with respect to amount of total support ranges from about 10 wt % to about 80 wt %, preferably from about 30 wt % to about 50 wt %;
the concentration of alumina with respect to total support ranges from about 20 wt % to about 80 wt %, preferably from about 40 wt % to about 60 wt %;
the concentration of support comprising mixture of ZSM-5 and gamma alumina ranges from about 80 wt % to about 95 wt %, preferably from about 90 wt % to about 95%, with respect to the total catalyst; and,
the SAR in the ZSM-5 ranges from about 20 to about 300, preferably about 30 to about 100.

In an exemplary preferred embodiment, the present disclosure provides a catalyst comprising 5% w/w gallium, and 95% w/w support comprising ZSM-5 and gamma alumina having surface area of about 231.27 m²/g, pore volume of about 0.53 cm³/g, pore diameter of about 71.48 Å, weak acid sites of about 0.191 Mmol/g, strong acid sites of about 0.414 Mmol/g and total acidity of about 0.605 Mmol/g.

In another exemplary preferred embodiment, the present disclosure provides a catalyst comprising 10% w/w gallium, and 90% w/w support comprising ZSM-5 and gamma alumina having surface area of about 239.80 m²/g, pore volume of about 0.430 cm³/g, pore diameter of about 71.53 Å, weak acid sites of about 0.19 Mmol/g, strong acid sites of about 0.43 Mmol/g and total acidity of about 0.62 Mmol/g.

In an exemplary non-limiting embodiment, the present disclosure provides a catalyst comprising 5% w/w zinc, and 95% w/w support comprising ZSM-5 and gamma alumina having surface area of about 248.53 m²/g, pore volume of about 0.417 cm³/g, pore diameter of about 68.23 Å, weak acid sites of about 0.251 Mmol/g, strong acid sites of about 0.452 Mmol/g and total acidity of about 0.704 Mmol/g.

In another exemplary non-limiting embodiment, the present disclosure provides a catalyst comprising 10% w/w zinc, and 90% w/w support comprising ZSM-5 and gamma alumina having surface area of about 239.92 m$^2$/g, pore volume of about 0.413 cm$^3$/g, pore diameter of about 68.24 Å, weak acid sites of about 0.26 Mmol/g, strong acid sites of about 0.503 Mmol/g and total acidity of about 0.763 Mmol/g.

In another exemplary non-limiting embodiment, the present disclosure provides a catalyst comprising 5% w/w zinc-gallium, and 95% w/w support comprising ZSM-5 and gamma alumina having surface area of about 243.51 m$^2$/g, pore volume of about 0.446 cm$^3$/g, pore diameter of about 71.81 Å, weak acid sites of about 0.22 Mmol/g, strong acid sites of about 0.405 Mmol/g and total acidity of about 0.625 Mmol/g.

The present disclosure also relates to process for preparing the catalyst, wherein, the zeolite is initially mixed with the binder to form extruder which is then dried, calcined, crushed and sieved to obtain powder having size of about −125 μm to about +45 μm. Metal is then loaded onto the powder to achieve different wt % metal loading (with respect to the support, i.e. zeolite+binder). The metal loaded support is then dried and calcined at temperature ranging from about 400° C. to about 600° C. for a period ranging from about 10 hours to about 15 hours to obtain the catalyst.

In an embodiment, drying of the extruder and the metal loaded support are carried out in oven at temperature ranging from about 80° C. to about 120° C. for time period ranging from about 10 hours to about 16 hours.

In an embodiment, calcination of the extruder is carried out at temperature ranging from about 500° C. to about 600° C., preferably at about 550° C. for time period ranging from about 10 hours to about 15 hours; and crushing of the extruder is carried out by ball milling.

In an embodiment, prior to mixing the zeolite and binder, the zeolite is subjected to calcination at temperature ranging from about 500° C. to about 600° C., preferably about 550° C. for time period ranging from about 10 hours to about 18 hours, preferably about 15 hours.

In an embodiment, the zeolite is mixed with the binder in presence of a reagent. The reagent also functions as binding agent.

In a preferred non-limiting embodiment of the present disclosure, the zeolite includes but is not limiting to ZSM-5, Faujasite including but not limited to Y; the binder includes, but is not limited to gamma alumina or silica, the metal is gallium or zinc or combination thereof and the reagent is an alcohol such as polyvinyl alcohol or an acid including but not limited to acetic acid or nitric acid or combinations thereof.

In an embodiment, when the binder is alumina, the zeolite is initially mixed with a source of Alumina selected from group comprising Pseudoboehmite, aluminium hydroxide, aluminium sulphate and aluminium chloride, preferably Pseudoboehmite. The extruder formed is then dried and calcined, as a result of which Alumina source forms Alumina.

In a preferred embodiment, the metal is Gallium, the support is ZSM-5 and the binder is gamma alumina.

In yet another embodiment of the present disclosure, the metal is loaded onto the support in the form of metal salt such as nitrate salt, chloride salt or sulphate salt, preferably nitrate salt by technique including but not limiting to wetness impregnation and ion exchange, or a combination thereof. In a preferred non-limiting embodiment of the present disclosure, the metal impregnation is done via wetness impregnation prior to or after support formation, i.e., prior to mixing the support with the binder.

In yet another embodiment of the present disclosure, when metal impregnation is done prior to support formation, the process comprises acts of impregnation of metal salt on calcined ZSM-5, before making the mixture of ZSM-5 and alumina, hereinafter referred to as modified method of impregnation.

The process of the present disclosure enables synthesis of different catalysts by varying the metals used, binder used, support used, metal loading, zeolite content or SAR ratios.

In an alternate embodiment, the catalyst of the present disclosure is prepared by replacing some amount of alumina from framework with gallium or zinc as per steaming procedure. The steaming process comprises acts of treating the catalyst with steam at about 700° C. for about 12 hours at the water flow rate of about 0.3 ml/min. During this process, alumina is released from the support creating vacant spaces which are exchanged with gallium or zinc. Steaming also reduces acidity, which is one of the main causes for by-product formation during the run. Steamed catalyst is evaluated for its activity.

The present disclosure also relates to a process for reforming heart cut naphtha stream, using the catalyst of the present disclosure.

In an embodiment, the heart cut naphtha stream comprises components selected from group comprising about 40 wt % to about 70 wt % paraffins, about 20 wt % to about 50 wt % naphthenes, about 5 wt % to about 20 wt % aromatic compounds and about 0 wt % to about 2 wt % olefins, or any combinations thereof.

In a preferred non-limiting embodiment of the present disclosure, the heart cut naphtha stream comprises about 40 wt % naphthenes, about 40 wt % paraffins and about 10 wt % aromatic compounds.

In another embodiment, the process of the present disclosure results in production of high octane aromatics useful for manufacturing high octane gasoline by conversion of paraffin, olefin and naphthene, in the naphtha stream.

In the process of the present disclosure, the catalyst is added into reactor, post which the reaction feed (naphtha stream) is fed into the reactor, thereby forming a reaction mixture. The reaction mixture is then cooled for separating gaseous and liquid product obtained which are then analyzed.

In an embodiment of the present disclosure, the reactor may be fixed bed reactor or fluidized bed reactor. In an exemplary embodiment, the reactor is a fixed bed reactor. In another embodiment, the process is carried out in a single fixed bed reactor.

In another embodiment of the present disclosure, the process is carried out in the absence of hydrogen and halide.

In another embodiment, the Table 4 below provides the constituents of a typical heart cut naphtha (BP in the range of 105° C.-190° C.) feed.

TABLE 4

Heart Cut Naptha Feed Constitution

| C No | N | i-p | n-p | Cyc Ol | i-o | n-o | Aromatic | Other | Total |
|---|---|---|---|---|---|---|---|---|---|
| 4 | | | | | 0.06 | | | | 0.06 |
| 5 | | | | | | | | | 0 |
| 6 | 0.21 | 0.05 | 0.1 | | | | | | 0.36 |
| 7 | 8.72 | 3.27 | 7.13 | | | 0.11 | 3.41 | | 22.64 |
| 8 | 13.73 | 11.64 | 9.84 | 0.03 | 0.04 | 0.25 | 4.93 | | 40.46 |
| 9 | 18.28 | 5.56 | | 0.1 | 0.41 | | 1.63 | | 25.98 |
| 10 | 2.63 | 0.88 | 1.92 | 1.42 | 1.04 | 1.64 | | | 9.53 |
| 11 | | | | 0.65 | | | | | 0.65 |
| 12+ | | 0.1 | | | | | | | 0.1 |
| Poly | | | | | | | | 0.22 | 0.22 |
| Total | 43.57 | 21.5 | 18.99 | 1.55 | 2.14 | 2.06 | 9.97 | 0.22 | 100 |

C. No. = Carbon Number,
N = Naphthenes,
i-p = iso-paraffins,
n-p = N-paraffins,
Cyc Ol = Cyclo-olefins,
i-o = iso-olefins,
n-o = N-olefins.

In another embodiment, Table 5 below provides the typical naphtha reforming conditions of the present disclosure.

TABLE 5

| Naphtha reforming conditions | |
|---|---|
| Temperature | 350-700° C., preferably 450° C.-600° C. |
| Pressure | 1 atm |
| Weight Hourly Space Velocity (WHSV) | 0.5-3 h$^{-1}$, preferably 1 hr$^{-1}$-2 hr$^{-1}$ |
| Feed injection time | 3-8 min |
| Reactor | Fixed bed |
| Nitrogen stripping rate | 50 cc/min |
| Stripping time | 60 min |

In an embodiment, the product obtained at the end of the reaction is collected and the gases liberated during the reaction are analyzed online to calculate the formation of dry gas and LPG.

In another embodiment, the instant process enables production of aromatics at very high conversions of paraffin, olefin and naphthene.

In another embodiment of the present disclosure, the C7 aromatic formation is in the range of about 10% to about 35%, preferably from about 13% to about 32%.

In yet another embodiment, the instant process enables reduction in the formation of side products including but not limiting to dry gas and LPG.

In yet another embodiment of the present disclosure, the dry gas formation is in the range of about 4% to about 20%; and the LPG formation is in the range of about 5% to about 25%, preferably about 7% to about 22%.

The present disclosure also relates to a system for carrying out the reaction procedure for reforming the naphtha stream.

In an embodiment, the system (100) comprises the components including Mass Flow Controller (MFC) (1), a valve (2), Feed bottle (3), Pump (4), Reactor (5), Furnace comprising temperature controller (6), Spiral condenser with sample receiver/sampling vial (7), Chiller (8), Water displacement tank (9), Balance for water displacement measurement (10), Vent line for gas analysis (11) and Temperature and pressure sensor (12).

In an embodiment, the naphtha stream will be stored in the feed bottle, which is then pumped into reactor using a pump through a valve. In an embodiment of the disclosure, the valve is a six port valve. The naphtha stream undergoes reaction with catalyst contained in the reactor, forming a reaction mixture. The reaction mixture then moves into the Spiral condenser with receiver, and into the Chiller, where separation of the gaseous and liquid products takes place. The separated gaseous and liquid products move back into the spiral condenser with sample receiver and thereafter into water displacement tank, followed by balance for water displacement measurement where weight of displaced water and the amount of gas formed is calculated. The gaseous products from the water displacement tank and the spiral condenser with sample receiver are then analyzed online via vent line.

In a particular embodiment, the present disclosure relates to a system for reforming heart cut naphtha stream, the system comprising at least one feed bottle (3), adapted to receive and store naphtha stream and at least one feed pump (4) fluidly connected to the at least one feed bottle (3). The at least one feed pump is configured to supply the naphtha stream into the reactor at the rate of WHSV of about 1 hr$^{-1}$ to about 3 hr$^{-1}$ through the valve. MFC (1) is also configured in the system for nitrogen gas purging. The system also comprises at least one valve (2) fluidly connected to the at least one feed pump, MFC, and the reactor. In an embodiment of the disclosure, the at least one valve is a six port valve or any manually controlled valve. The at least one valve is configured to receive the naphtha stream from the at least one feed pump and nitrogen gas through MFC (1), and introduce the nitrogen gas and the naphtha stream into the reactor. The at least one reactor (5) receives catalyst manually in powder form, and is configured to carry out the reaction on the naphtha stream by the catalyst to form reaction mixture. The reactions being carried out in the reactor include but are not limited to isomerization, dehydrocyclization and dehydrogenation to form the reaction mixture from the naphtha stream. The system further comprises at least one spiral condenser with sample receiver/sampling vial (7) fluidly connected to the at least one reactor. The spiral condenser with sample receiver/sampling vial (7) is configured to receive the reaction mixture from the reactor, and configured to introduce the reaction mixture into the at least one Chiller. The at least one chiller (8) is configured to cool down the reaction mixture to about 0° C., for separation of gaseous and liquid product, and configured to introduce the separated gaseous and liquid product into the spiral condenser with sample receiver/sampling vial. Further, the at least one spiral condenser with sample receiver/sampling vial (7) is also fluidly connected to at least one water displacement tank (9) which is configured to receive the separated gaseous and liquid product after chilling from the chiller, and calculate weight of displaced water and the amount of gas formed. The system also comprises at least one balance (10) for water displacement measurement configured to measure weight of displaced water and the amount of gas formed. Additionally, at least one vent line (11) fluidly connected to the at least water displacement tank (9) and the at least one spiral condenser with sample receiver/sampling vial is provided in the system. The at least one vent line (11) is configured to receive the gaseous products from the water displacement tank and the spiral condenser with sample receiver, which are then analyzed online using gas chromatographic technique.

In an embodiment of the present disclosure, the reactor may be a fixed bed reactor or fluidized bed reactor.

In another embodiment of the present disclosure, the reactor is raised to a temperature ranging from about 350° C. to about 700° C., the desired reaction temperature, using the Furnace comprising temperature controller (6) under the constant flow of nitrogen 50 cc/min introduced through the six port valve. The temperature inside the reactor is maintained with the help of the temperature controller and the temperature and pressure of the reactor bed are monitored using the temperature and pressure sensor (12).

In another embodiment of the present disclosure, the distribution of aromatic and other compounds collected through Condenser is investigated using PIONA, which is analytical technique used for quantitative analysis of n-paraffin, iso-paraffin, naphthenes, cyclo-olefins, iso-olefins and aromatics.

Additional embodiments and features of the present disclosure will be apparent to one of ordinary skill in art based upon description provided herein. The embodiments herein provide various features and advantageous details thereof in the description. Descriptions of well-known/conventional methods and techniques are omitted so as to not unnecessarily obscure the embodiments herein. Further, the disclosure herein provides for examples illustrating the above described embodiments, and in order to illustrate the embodiments of the present disclosure, certain aspects have been employed. The examples used herein for such illustration are intended merely to facilitate an understanding of ways in which the embodiments herein may be practiced and to further enable those of skill in the art to practice the embodiments herein. Accordingly, the following examples should not be construed as limiting the scope of the embodiments herein.

EXAMPLE 1

Preparation of Catalyst

H-ZSM-5 obtained after calcination of ZSM-5 (SAR 50) at a temperature of about 550° C. for time period of about 15 hours, is mixed with Pseudoboehmite (source material of binder material gamma alumina) at concentrations of 40 wt % and 60 wt % respectively. The physical mixture of H-ZSM-5 & pseudoboehmite is converted to dough using 2% 0.158 N HNO3 which is extruded. The extruder is dried overnight in oven at about 120° C. and calcined at about 550° C. for about 15 hours to convert pseudoboehmite to gamma alumina. The alumina and nitric acid are used as binding agents for giving strength. The calcined extrudate is crushed and sieved to achieve about −125 μm to about +45 μm size powder. Once the support is ready, the metal salts are deposited using impregnation method. Metal loading is based on the wt/wt ratio of support and active metal. The metal loaded material is then dried at temperature of about 120° C. in oven and calcined at about 550° C. for about 15 hours to obtain the catalyst. The preferred metal salt used is nitrate salt. Similarly, other catalysts are prepared with different metal loadings, different zeolite content and SAR ratios.

Table 6 below shows the Surface area and pore volume analysis of the catalysts of the present disclosure.

TABLE 6

Surface area and pore volume analysis for the catalysts

| Sl. Nos. | Sample description | BET SA (m²/g) | Pore vol. (cm³/g) | pore diameter (Å) |
|---|---|---|---|---|
| 1 | Support (40% ZSM-5 (SAR-50) + 60% Alumina) | 255.8940 | 0.443665 | 69.5516 |
| 2 | 5% Zn | 248.5316 | 0.416578 | 68.2286 |
| 3 | 10% Zn | 239.9162 | 0.413269 | 68.2420 |
| 4 | 5% Ga | 231.2769 | 0.52831 | 71.1672 |
| 5 | 10% Ga | 239.8092 | 0.430327 | 71.5254 |
| 6 | 5% Ga—5% Zn | 243.5143 | 0.446627 | 71.8084 |

From the above table, it can be observed that the change in Surface Area [SA], Pore Volume [PV] & Pore Diameter are in line with the aspects observed in the art. Once metals are loaded on the support, SA and PV tend to decrease, because of mouth pore blocking.

Table 7 below provides the acidity measurement data for support and different metal loaded catalysts.

TABLE 7

Acidity measurement data for support and different metal loaded catalyst

| Sl. Nos. | Sample | Weak acid sites Mmol/g | Strong acid sites Mmol/g | Total acidity Mmol/g |
|---|---|---|---|---|
| 1 | SUPPORT (40% ZSM-5 (SAR-50) + 60% Alumina) | 0.203 | 0.472 | 0.675 |
| 2 | 5% Zn | 0.251 | 0.452 | 0.704 |
| 3 | 10% Zn | 0.26 | 0.503 | 0.763 |
| 4 | 5% Ga | 0.191 | 0.414 | 0.605 |
| 5 | 10% Ga | 0.19 | 0.43 | 0.62 |
| 6 | 5% Ga—Zn | 0.22 | 0.405 | 0.625 |

As can be observed from the above table, Gallium loading on the support results in maximum reduction in acidity, indicating that said catalyst would have less cracking tendency and higher gasoline yields.

EXAMPLE 2

Naphtha Reforming Procedure

This example illustrates the reaction procedure for the reforming. The reaction is performed in a fixed bed reactor (100) (FIG. 1) of 15 gm maximum catalyst having temperature and pressure controller (12) and other components as shown in diagram. After charging the 12 gm catalyst for ex., prepared in Example 1, the reactor (5) temperature is raised to about 550° C., the desired reaction temperature, using the Furnace (6) under the constant flow of nitrogen 50 cc/min via (1). The feed is introduced into the reactor from feed bottle (3) using feed pump (4) at the rate of WHSV of about 1 hr$^{-1}$ to about 3 hr$^{-1}$ through the six port valve (2). Nitrogen gas is used to strip off the reactants and products formed during the reaction. The reaction mixture after reaction is passed to the Condenser, which is a spiral jacketed tube with cold water circulating inside to enable the gases such as dry gases and hydrogen leaving the reactor to condense. The products, including the gaseous and liquid products are passed onto the Receiver (7) and cooled to about 0° C. using the Chiller (8) for the gaseous and liquid product separation. The Water displacement tank (9) and Balance for water displacement measurement (10) for calculating weight of displaced water are used to calculate the amount of gas formed. The gaseous products formed during the reaction are analyzed online via Vent line (11). The distribution of aromatic and other compounds collected through Condenser is investigated using PIONA. The material balance for all the reaction is >95%. Conversion obtained using above methodology is >99% with aromatic selectivity of about 60.88%.

EXAMPLE 3

Activity of the Catalysts

As stated in example 1, the feed is passed over different catalyst composition [(12 gm) which corresponds to the total weight of catalyst (Metal+ZSM-5+alumina)] at the experimental conditions of about 500° C., about 50 cc/min flow of nitrogen at about 1 atm pressure, WHSV=about 1.5 hr$^{-1}$, feed injection time of about 5 minutes, stripping time of about 60 minutes. The results are compared with the unloaded metal support and commercial catalyst. The dry gas consists of $C_1$, $C_2$ and $H_2$; and LPG consists of $C_4$ to $C_6$ gases. The results of the study are depicted in Table 8 below.

TABLE 8

ACTIVITY OF CATALYSTS

| Sample | Gasoline (%) | LPG (%) | Dry gas (%) | Coke (%) | $H_2$ (%) | Aromatics (%) | Conv. (%) |
|---|---|---|---|---|---|---|---|
| Commercial catalyst (Pt-based) | 79.66 | 8.39 | 5.91 | 6.04 | 3.01 | 48.35<br>C6 = 1.40<br>C7 = 13.45<br>C8 = 21.5 | 63.6 |
| SUPPORT (40% w/w ZSM-5 (SAR-50) + 60% w/w Alumina) | 55.78 | 25.69 | 11.23 | 7.30 | 0.47 | 36.79<br>C6 = 6.71<br>C7 = 16.63<br>C8 = 9.52 | 67.16 |
| 5% Zn on the support | 66.07 | 17.87 | 8.66 | 7.4 | 1.7 | 45.94<br>C6 = 6.72<br>C7 = 23.08<br>C8 = 12.79 | 68.53 |
| 10% Zn on the support | 66.52 | 15.38 | 10.07 | 8.03 | 1.9 | 45.70<br>C6 = 6.68<br>C7 = 23.40<br>C8 = 12.79 | 70.08 |
| 5% Ga on the support | 56.21 | 23.43 | 10.88 | 9.48 | 1.36 | 43.43<br>C6 = 6.58<br>C7 = 19.91<br>C8 = 11.87 | 76.01 |
| 10% Ga on the support | 59.65 | 22.18 | 11.05 | 7.11 | 1.84 | 56.07<br>C6 = 7.49<br>C7 = 22.92<br>C8 = 14.58 | 91.56 |
| 5% Ga—Zn on the support | 62.15 | 21.94 | 8.65 | 7.36 | 1.44 | 42.76<br>C6 = 5.88<br>C7 = 20.98<br>C8 = 12.74 | 67.33 |
| 10% Ga on the support (reduced catalyst) | 56.86 | 24.25 | 11.52 | 5.95 | 1.92 | 61.27<br>C6 = 13.17<br>C7 = 35.1<br>C8 = 23.87 | 91.5 |

As is evident from the table, Gallium promoted catalyst shows highest conversion compared to other catalysts. The dehydrogenation capacity of zinc is also promising. Similar experiments are performed under reduced state and there is marginal increment in the gallium activity as can be seen from the above table. This clearly indicates that there is no requirement of hydrogen during the reaction in case of gallium and zinc.

EXAMPLE 4

Effect of Temperature on Naptha Reforming

This example illustrates the effect of temperature on the conversion and selectivity for heart cut naphtha reforming. The experimental procedure followed is as described in Example 2 with gallium promoted catalyst (10 g Ga and 90 g ZSM-5+Alumina). The experimental results are presented in Table 9 below.

TABLE 9

EFFECT OF TEMPERATURE ON NAPHTHA REFORMING

| Temperature, °C. | 450 | 500 | 550 |
|---|---|---|---|
| Gasoline (%) | 64.27 | 59.65 | 61.59 |
| Dry gas (%) | 5.61 | 11.05 | 18.44 |
| LPG (%) | 22.58 | 22.18 | 12.20 |
| Coke (%) | 7.25 | 7.11 | 7.77 |
| Hydrogen (%) | 1.14 | 1.84 | 3.02 |
| Aromatics (%) | 45.24 | 56.07 | 60.88 |
|  | C6 = 5.54 | C6 = 7.49 | C6 = 12.20 |
|  | C7 = 19.69 | C7 = 22.92 | C7 = 30.49 |
|  | C8 = 14.50 | C8 = 14.58 | C8 = 13.14 |
| conversion (%) | 67.87 | 91.56 | 99.29 |

As can be observed from the table, there is increase in % conversion as the temperature increases from 450 to 550 along with increase in % conversion.

EXAMPLE 5

Effect of WHSV on Naphtha Reforming

This example illustrates the effect of WHSV on the conversion and selectivity for heart cut naphtha reforming. The experimental procedure followed is as described in Example 2 with gallium promoted catalyst (10 g Ga and 90 g ZSM-5+Alumina). The experimental results are presented in Table 10 below.

TABLE 10

EFFECT OF WHSV ON NAPHTHA REFORMING

| WHSV, $h^{-1}$ | 1 | 1.5 | 2 |
|---|---|---|---|
| Gasoline (%) | 60.52 | 61.59 | 60.00 |
| Dry gas (%) | 20.00 | 18.44 | 21.16 |
| LPG (%) | 6.97 | 12.20 | 11.74 |
| Coke (%) | 12.50 | 7.77 | 7.10 |
| Hydrogen (%) | 2.99 | 3.02 | 3.45 |
| Aromatics formed (%) | 60.10 | 60.88 | 56.63 |
|  | C6 = 14.10 | C6 = 12.20 | C6 = 11.38 |
|  | C7 = 29.58 | C7 = 30.49 | C7 = 28.12 |
|  | C8 = 10.15 | C8 = 13.14 | C8 = 12.20 |
| conversion (%) | 98.61 | 99.29 | 94.03 |

The hydrogen yield at about 550° C. is found to be comparable with that of the commercial catalyst hydrogen yield. Commercial catalyst showed yield of gasoline 80.65%, Dry gas 5.98%, LPG 8.49%, coke 6.12%, H$_2$ 3.05%, aromatic formed 48.96% (A6=1.4, A7=13.45, A8=21.5) at the conversion of 63.6%. The data provided for commercial catalyst is obtained at 1.5 h$^{-1}$ WHSV. The gallium promoted catalyst of the present disclosure, at the same reaction conditions, exhibits higher conversions and selectivity towards A6 and A7 compared to the commercial catalyst even with the use of non-noble metal based catalyst. This indicates that the catalyst of the present disclosure is more active compared to the commercial noble metal based catalyst. As can be observed from the table above, 1.5 is the preferred value of WHSV.

EXAMPLE 6

Comparative Activity of Different Catalysts

Different catalysts are compared for their activity on Naphtha reforming and the results are tabulated in table 11 below:

TABLE 11

Catalytic activation study results

| Sample | Gasoline | LPG | Dry gas | Coke | H$_2$ | Aromatics | Conv. |
|---|---|---|---|---|---|---|---|
| 10% Ga on Support-A (40% w/w ZSM-5 (SAR-50) + 60% w/w Alumina) (Steamed catalyst prepared at 700° C., 12 h, 0.3 ml/min water inlet) | 63.36 | 17.36 | 8.89 | 7.88 | 1.62 | 33.36<br>C6 = 1.62<br>C7 = 9.90<br>C8 = 12.00<br>C9 = 6.81 | 47.28 |
| 10% Ga (20% ZSM-5-SAR-50 + 80% Al2O3) | 63.26 | 11.99 | 18.87 | 5.88 | 3.68 | 60.82<br>C6 = 8.84<br>C7 = 25.81<br>C8 = 15.39<br>C9 = 5.16 | 96.10 |
| 10% Ga (30% ZSM-5-SAR-50 + 70% Al2O3) | 66.16 | 9.35 | 18.78 | 5.71 | 3.64 | 65.16<br>C6 = 11.76<br>C7 = 29.51<br>C8 = 13.21<br>C9 = 4.13 | 98.38 |
| 10% Ga (40% ZSM-5-SAR-80 + 60% Al2O3) | 67.02 | 9.19 | 17.82 | 5.96 | 3.59 | 66.94<br>C6 = 11.08<br>C7 = 31.34<br>C8 = 17.01<br>C9 = 3.70 | 99.96 |
| 10% Ga (40% ZSM-5-SAR-50 + 60% Al2O3) Modified method of impregnation | 72.26 | 5.94 | 16.61 | 5.19 | 3.07 | 71.02<br>C6 = 15.57<br>C7 = 31.62<br>C8 = 12.35<br>C9 = 3.66 | 98.25 |
| 10% Ga (40% Y-SAR-280 + 60% Al2O3) | 66.41 | 11.97 | 16.36 | 5.19 | 3.59 | 64.84<br>C6 = 8.25<br>C7 = 27.42<br>C8 = 17.97 | 97.73 |

TABLE 11-continued

Catalytic activation study results

| Sample | Gasoline | LPG | Dry gas | Coke | $H_2$ | Aromatics | Conv. |
|---|---|---|---|---|---|---|---|
| 10% Ga (40% ZSM-5-SAR-50 + 60% Al2O3) Without steaming (fluidized reactor system) | 62.56 | 20.54 | 13.13 | 3.77 | 1.81 | C9 = 5.97<br>40.46<br>C6 = 5.22<br>C7 = 14.71<br>C8 = 12.55<br>C9 = 5.76 | 62.36 |

From the above table, it is can be observed that the Gallium based catalysts of the present disclosure, exhibit high conversion yields under these experimental conditions. Further, the same catalyst is tested in fluidized condition at WHSV=about 1.5 hr$^{-1}$, temperature=about 550 deg. C., cat-to-oil about 6.67. The activity comparison is shown in the above table. From the results it is clear that the catalyst can be used for naphtha reforming in fluidized condition.

Advantages

The present disclosure provides a catalyst comprising Group IIIA or Group IIB metals, preferably gallium, supported on zeolite (ZSM-5) for manufacturing of high octane aromatics in absence of hydrogen in order to achieve high selectivity and activity and also reduces the operating cost.

The catalyst of the present disclosure enables production of C7 aromatics as a major product at very high conversions of heart cut naphtha.

The naphtha reforming process using the catalyst of the present disclosure is eco-friendly, economical and avoids effluent disposal problem.

The process of naphtha reforming using the catalyst of the present disclosure eliminates the use of halides for catalyst activation which creates environmental and metallurgical problems, which is a major drawback of conventional processes which use halides to maintain acid function in catalyst & metal dispersion.

The present disclosure also utilizes fluidized bed reactor system.

The reformate produced by the process of naphtha reforming of the present disclosure contains a higher ratio of aromatics compared to that of aliphatic and naphthenic compounds. The PIONA analysis confirmed that naphthenic and aliphatic compounds present in the naphtha stream are converted from approximately 89% to about less than 1% during the reformation reaction.

The present disclosure obviates the use of platinum group metals for reforming and instead uses metals such as gallium or zinc which are less expensive.

Thus, the present disclosure is able to successfully overcome the various deficiencies of prior art and provide for an improved process for reforming heart cut naphtha stream.

Additional embodiments and features of the present disclosure will be apparent to one of ordinary skill in art based on the description provided herein. The embodiments herein provide various features and advantageous details thereof in the description. Descriptions of well-known/conventional methods and techniques are omitted so as to not unnecessarily obscure the embodiments herein.

The foregoing description of the specific embodiments fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments in this disclosure have been described in terms of preferred embodiments, those skilled in the art will recognize that the embodiments herein can be practiced with modification within the spirit and scope of the embodiments as described herein.

Throughout this specification, the word "comprise", or variations such as "comprises" or "comprising" wherever used, will be understood to imply the inclusion of a stated element, integer or step, or group of elements, integers or steps, but not the exclusion of any other element, integer or step, or group of elements, integers or steps.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

REFERENCE NUMERAL TABLE

| Sl. Nos. | Reference Nos. | Description |
|---|---|---|
| 1 | 100 | System |
| 2 | 1 | Gas through MFC |

-continued

REFERENCE NUMERAL TABLE

| Sl. Nos. | Reference Nos. | Description |
|---|---|---|
| 3 | 2 | Six port valve |
| 4 | 3 | Feed bottle |
| 5 | 4 | Pump |
| 6 | 5 | Reactor |
| 7 | 6 | Furnace |
| 8 | 7 | Spiral condenser with sample receiver |
| 9 | 8 | Chiller |
| 10 | 9 | Water displacement tank |
| 11 | 10 | Balance for water displacement measurement |
| 12 | 11 | Vent line for gas analysis |
| 13 | 12 | Temperature and pressure sensor |

We claim:

1. A zinc-free naphtha reforming catalyst comprising a Group IIIA metal, a zeolite and a binder, wherein the Group IIIA metal is gallium or a gallium salt at a concentration ranging from 5 wt % to 20 wt % of the zinc-free naphtha reforming catalyst.

2. A process for preparing the zinc-free naphtha reforming catalyst as claimed in claim 1, said process comprising:
   a) adding a binder source to the zeolite or adding a Group IIIA metal to the zeolite followed by the binder source, optionally along with a reagent to obtain an extrudate;
   b) drying and calcining the extrudate to obtain a calcined extrudate;
   c) crushing the calcined extrudate to obtain a powder;
   d) optionally loading the Group IIIA metal onto the powder to obtain a gallium metal loaded powder; and
   e) drying and calcining the powder of step c) or step d) to obtain the naphtha reforming catalyst,
   wherein the Group IIIA metal is added in step a) or step d) or a combination thereof, and wherein the Group IIIA metal is gallium or a gallium salt at a concentration ranging from 5 wt % to 20 wt % of the zinc-free naphtha reforming catalyst.

3. The process as claimed in claim 2, wherein prior to adding the binder source or the metal to the zeolite, the zeolite is calcined at a temperature ranging from about 500° C. to about 550° C. for a time period ranging from about 10 hours to about 18 hours; wherein the binder source is selected from a group consisting of Pseudoboehmite, aluminum hydroxide, aluminum sulphate and aluminum chloride; wherein the reagent is selected from an alcohol and an acid, wherein the alcohol is polyvinyl alcohol and wherein the acid is selected from the group consisting of acetic acid and nitric acid; and wherein the reagent functions as a binding agent.

4. The process as claimed in claim 2, wherein the calcining of the extrudate is carried out at a temperature ranging from about 500° C. to about 600° C., for a time period ranging from about 10 hours to about 15 hours; the crushing is carried out in a ball mill; and the powder obtained has a size ranging from 45 μm to 125 μm.

5. The process as claimed in claim 2, wherein the metal is loaded onto the powder or added to the zeolite in the form of a gallium salt selected from a group consisting of a gallium nitrate salt, a gallium chloride salt, and a gallium sulphate salt, by a technique selected from the group consisting of wetness impregnation and ion exchange.

6. The process as claimed in claim 2, wherein the drying is carried out at a temperature ranging from about 80° C. to about 120° C., for a time period ranging from about 10 hours to about 16 hours; and the calcining temperature of step e) ranging from about 400° C. to about 600° C. for a time period ranging from about 10 hours to about 15 hours.

7. A process for reforming a naphtha stream, said process comprising:
   a) combining the naphtha stream under naphtha reforming conditions with the zinc-free naphtha reforming catalyst as claimed in claim 1 to form a product mixture; and
   b) separating a gaseous product and a liquid product from the product mixture.

8. The process as claimed in claim 7, wherein the process is carried out in a fixed bed reactor or a fluidized bed reactor; and wherein the process is carried out at temperature ranging from about 350° C. to about 700° C.; at a Weight Hourly Space Velocity ranging from about 0.5 $hr^{-1}$ to about 3 $hr^{-1}$; at pressure of about 1 atm, in presence of nitrogen and in absence of hydrogen and halide.

9. The process as claimed in claim 7, wherein the naphtha stream consists of a component selected from a group consisting of paraffin at a concentration ranging from about 40 wt % to about 70 wt %, about 40 wt %, naphthene at a concentration ranging from about 20 wt % to about 50 wt %, an aromatic compound at a concentration range of about 5 wt % to about 20 wt %, and an olefin at a concentration ranging from about 0 wt % to about 2 wt %, or any combinations thereof.

10. The process as claimed in claim 7, wherein the process yields aromatic compounds at a concentration ranging from about 50% w/w to 90% w/w, with a conversion yield ranging from about 50% to about 100%; and wherein the aromatic compound is a high octane aromatic compound.

11. The zinc-free naphtha reforming catalyst as claimed in claim 1, wherein the zeolite and the binder combination is at a concentration ranging from 80 wt % to 95 wt % of the zinc-free naphtha reforming catalyst.

12. The zinc-free naphtha reforming catalyst as claimed in claim 1, wherein the zeolite is at a concentration ranging from about 10 wt % to about 80 wt % of the zeolite and binder combination; and the binder is at a concentration ranging from about 20 wt % to about 80 wt % of the zeolite and binder combination.

13. The zinc-free naphtha reforming catalyst as claimed in claim 1, wherein the zeolite has a pore diameter ranging from about 0.5 nm to about 0.8 nm; ratio of silica to alumina in the zeolite ranges from about 20 to about 300; and the binder is selected from the group consisting of alumina, silica and a combination thereof.

14. The zinc-free naphtha reforming catalyst as claimed in claim 1, wherein the catalyst has a surface area ranging from about 225 $m^2/g$ to about 250 $m^2/g$, a pore volume ranging from about 0.40 $cm^3/g$ to about 0.45 $cm^3/g$, a pore diameter ranging from about 68 Å to about 75 Å, weak acid sites ranging from about 0.19 Mmol/g to about 0.26 Mmol/g, strong acid sites ranging from about 0.40 Mmol/g to about 0.51 Mmol/g, and a total acidity ranging from about 0.6 Mmol/g to about 0.77 Mmol/g.

15. The process as claimed in claim 2, wherein the zeolite and binder combination is at a concentration ranging from about 80 wt % to about 95 wt % of the catalyst.

16. The process as claimed in claim 2, wherein the zeolite is at a concentration ranging from about 10 wt % to about 80 wt % of the zeolite and binder combination; and the binder is at a concentration ranging from about 20 wt % to about 80 wt % of the zeolite and binder combination.

17. The process as claimed in claim 2, wherein the zeolite is selected from a group consisting of ZSM-5, Zeolite Y, and a combination thereof; the zeolite has a pore diameter ranging from about 0.5 nm to about 0.8 nm; a ratio of silica to alumina in the zeolite ranges from about 20 to about 300; and the binder is selected from group consisting of alumina, and silica, and a combination thereof.

18. The process as claimed in claim 2, wherein the catalyst has a surface area ranging from about 225 m$^2$/g to about 250 m$^2$/g, a pore volume ranging from about 0.40 cm$^3$/g to about 0.45 cm$^3$/g, a pore diameter ranging from about 68 Å to about 75 Å, weak acid sites ranging from about 0.19 Mmol/g to about 0.26 Mmol/g, strong acid sites ranging from about 0.40 Mmol/g to about 0.51 Mmol/g, and a total acidity ranging from about 0.6 Mmol/g to about 0.77 Mmol/g.

19. The zinc-free naphtha reforming catalyst as claimed in claim 1, wherein the zeolite is a Faujasite.

20. The zinc-free naphtha reforming catalyst as claimed in claim 1, wherein the zeolite is selected from a group consisting of ZSM-5, Zeolite Y, and a combination thereof.

\* \* \* \* \*